July 29, 1969  N. B. AGDUR  3,458,808
APPARATUS FOR MEASURING THE PROPERTIES OF
A MATERIAL BY RESONANCE TECHNIQUES
Filed May 26, 1965  3 Sheets-Sheet 1

INVENTOR.
NILS BERTIL AGDUR
BY Hane and Nyint
ATTORNEYS

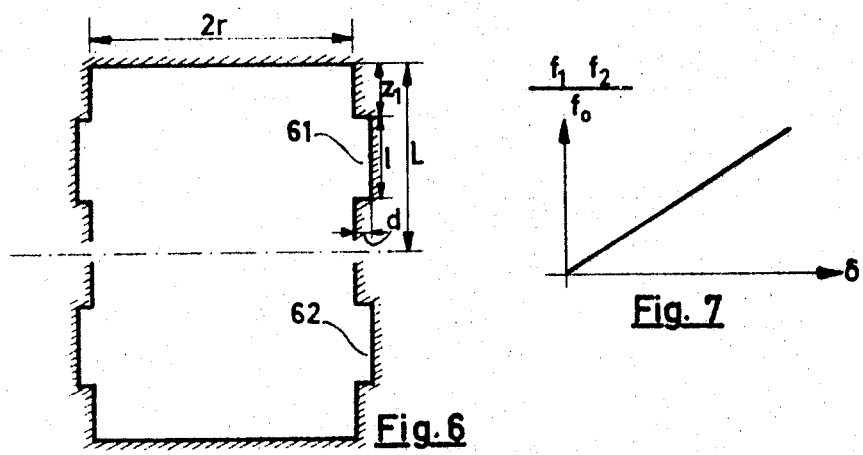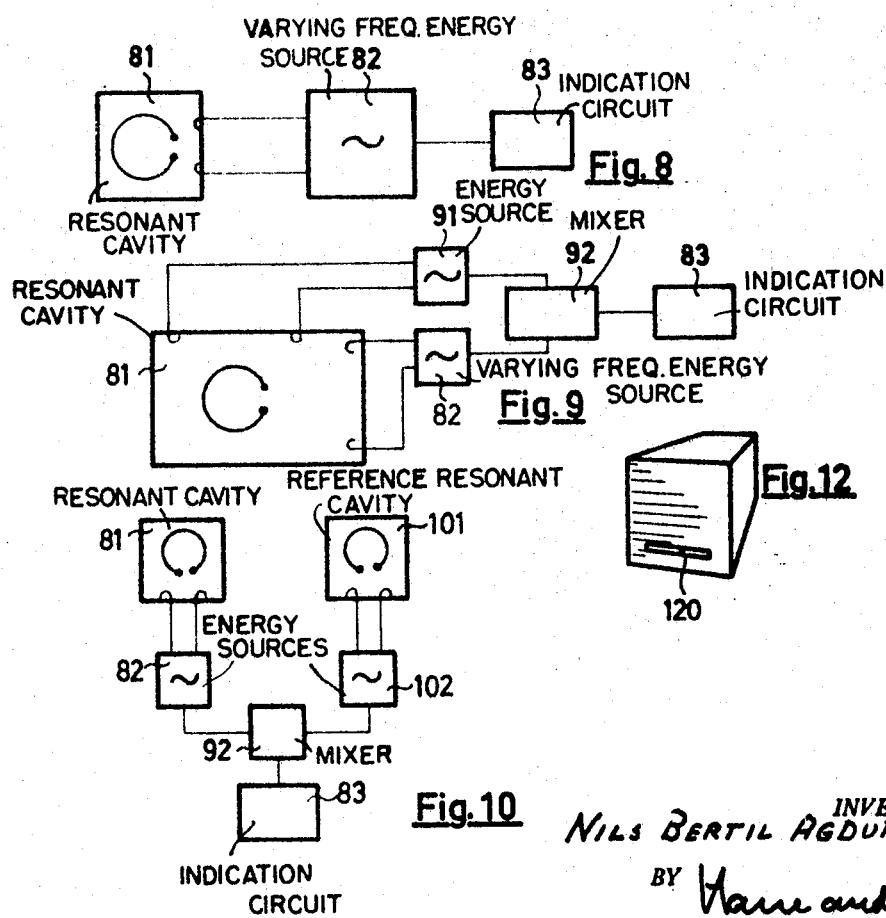

July 29, 1969  N. B. AGDUR  3,458,808
APPARATUS FOR MEASURING THE PROPERTIES OF
A MATERIAL BY RESONANCE TECHNIQUES
Filed May 26, 1965  3 Sheets-Sheet 3
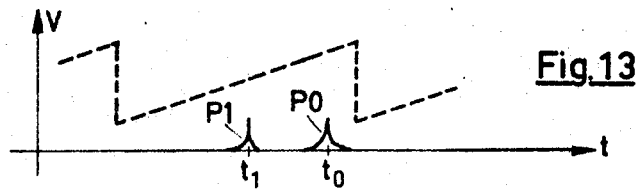
Fig. 13
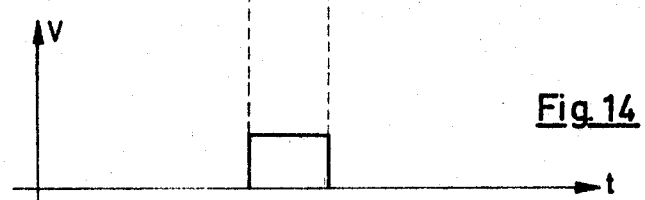
Fig. 14
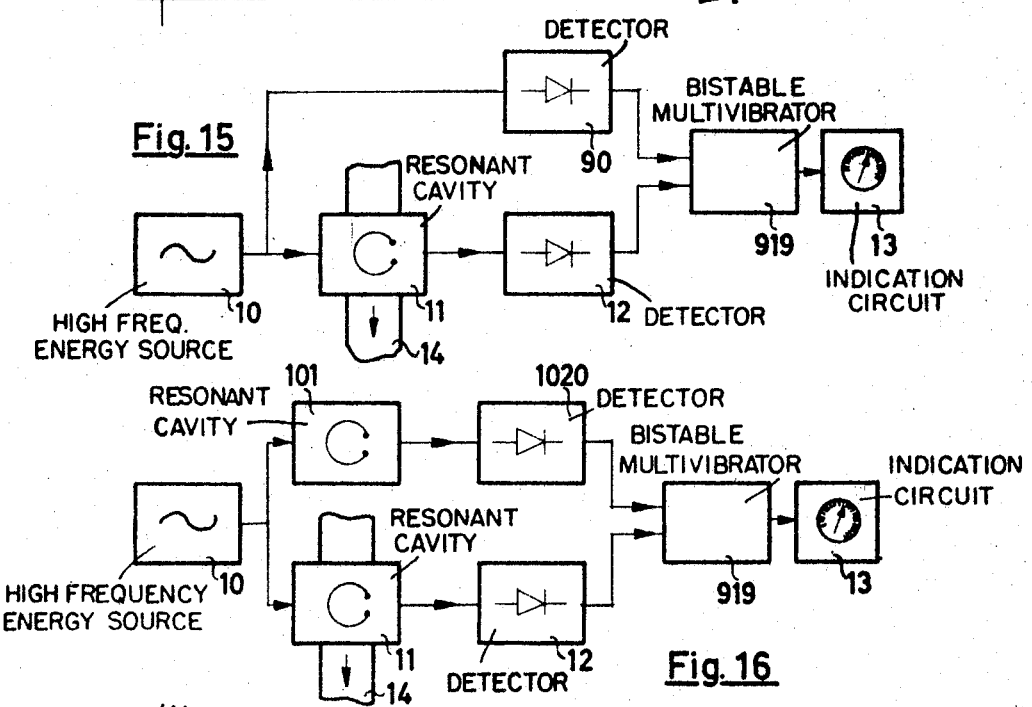
Fig. 15
Fig. 16
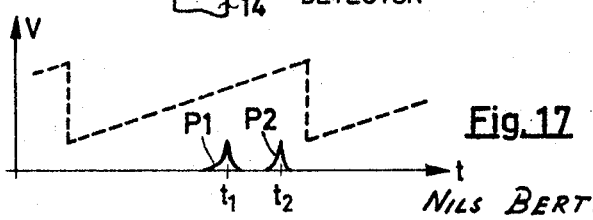
Fig. 17
INVENTOR.
NILS BERTIL AGDUR
BY Hane and Nydick
ATTORNEYS United States Patent Office 3,458,808
Patented July 29, 1969

3,458,808
APPARATUS FOR MEASURING THE PROPERTIES OF A MATERIAL BY RESONANCE TECHNIQUES
Nils Bertil Agdur, Vilans vag 23, Danderyd, Sweden
Filed May 26, 1965, Ser. No. 458,861
Claims priority, application Sweden, May 29, 1964, 6,536/64; Feb. 8, 1965, 1,578/65
Int. Cl. G01r 27/04; H01p 7/06
U.S. Cl. 324—58.5
6 Claims

ABSTRACT OF THE DISCLOSURE

There is disclosed apparatus for measuring properties of a material by utilizing microwave resonance techniques. The material is placed in a cavity resonator which is fed by a microwave generator which sweeps through a range of frequencies. The resonator has two resonant frequency peaks, one of which is dependent on the test material and the other independent thereof. The time interval between the resonant frequency peaks is a measure of the property of the material. In this way properties such as moisture content, thickness, etc. can be measured.

---

This invention pertains to a device for measuring the properties of a material, such as moisture content, thickness, purity, etc.

The invention contemplates a device comprising a high frequency electric energy source, a material unit which has in the form of a resonant cavity an opening such that the material can pass through it, and an indication device to indicate the desired property. Such a device according to this invention is characterized in that the cavity has pronounced resonant properties for at least two frequencies and comprises circuits for generating a difference quantity based on these two frequencies, and that this difference quantity is a measure of a property of the material.

Figure 1:
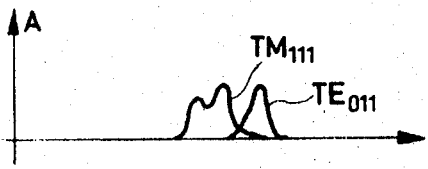
Figure 2:
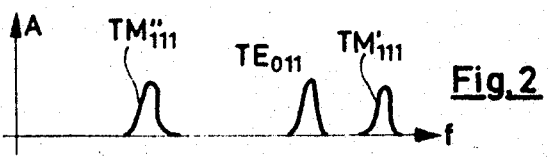
Figure 3:
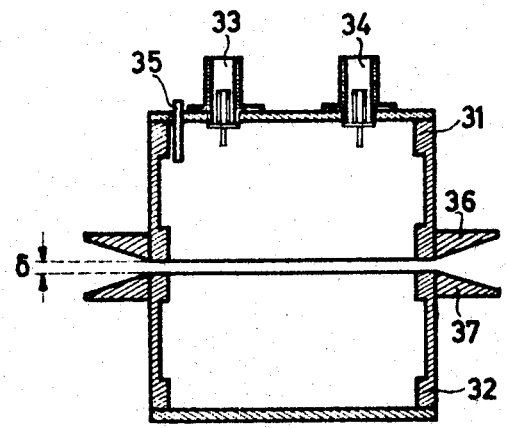
Figure 4:
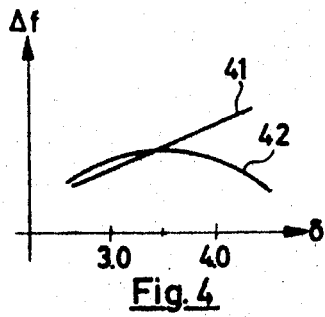
Figure 5:
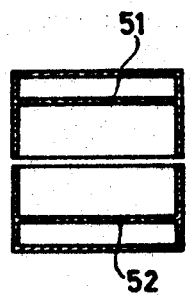
Figure 11:
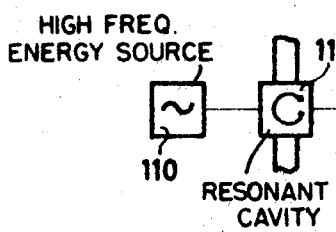

The invention will be described in detail in connection with the enclosed drawings, where FIGS. 1 and 2 show two frequency response diagrams,
FIG. 3 shows a microwave cavity,
FIG. 4 shows curves for a frequency difference $\Delta f$ as a function of an air gap $\delta$ between two halves of a microwave cavity,
FIG. 5 shows another microwave cavity,
FIG. 6 shows some dimensions of the cavity in FIG. 3,
FIG. 7 shows a curve of the same kind as in FIG. 4,
FIG. 8 shows schematically a device according to the invention,
FIG. 9 shows another modification of the device in FIG. 8,
FIG. 10 shows yet another modification of the device in FIG. 8,
FIG. 11 shows the principle of another device according to the invention,
FIG. 12 shows in principle a third cavity according to the invention,
FIGS. 13–14 show diagrams for the principle of operation of the devices according to following figures,
FIG. 15 shows a modification of the device in FIG. 11,
FIG. 16 shows another modification, and
FIG. 17 shows a diagram to facilitate the description of the mode of operation of the device in FIG. 16.

As already mentioned, a device according to this invention comprises a high-frequency electrical signal generator, a material unit in the form of a cavity having an opening such that the material can pass through the cavity, and an indication circuit to indicate the desired property. The material unit is a microwave resonant cavity designed so that it has resonant properties for two adjacent but well separated frequencies. With the cavity split into two identical cavity halves, the cavity would, if excited in two modes, such as the $TE_{011}$ and $TM_{111}$ modes, have resonant properties at the same frequency for these two modes. In practice, the two halves of the cavity are not exactly identical and therefore the two resonant frequencies are slightly separated, see FIG. 1. One of the modes, $TE_{011}$, has a well defined resonant frequency, while the other mode, $TM_{111}$, has a double peak making the determination of the resonant frequency difficult.

Experiments have shown, that if one of the cavity halves is designed with or supplied with $a$, from electrical point of view, symmetry impairing element, such as a screw, an extrusion or similar element, the cavity will have pronounced resonant properties for two adjacent but well separated frequencies. This is illustrated in FIG. 2, which shows that the resonance curve for the mode $TM_{111}$ now is split into two separate peaks $TM'_{111}$ and $TM''_{111}$.

A cavity of the above mentioned kind is shown in FIG. 3. The cavity is a circular cylinder divided along a plane perpendicular to the symmetry axis of the cylinder into two halves 31 and 32. The distance between the halves is $\delta$. The half-cavity 31 has devices for signal coupling in and out, 33 and 34, and a screw 35, which acts as a symmetry impairing element from an electrical point of view. The material to be measured is to be inserted between the two halves 31 and 32. To facilitate the insertion both halves have flanges 36 and 37 which guide the material. When measuring certain kinds of materials, such as paper, there is a risk that particles will collect in the cavity halves and it is therefore advisable to blow air through both cavity halves. Openings for the air can be arranged near the horizontal edge of the flanges 36 and 37, but this is not shown in FIG. 3. From FIG. 3 it can be seen that each cavity half in its interior region has a circular extrusion into the cylinder wall. This will be described in detail in connection with FIG. 6.

The utilization of two different modes such as $TE_{011}$ and $TM_{111}$ in the measurement eliminates to a certain extent the unfavourable influence on the measurement from variations in the distance $\delta$ between the cavity halves, but this influence cannot be eliminated completely. This is shown diagrammatically in FIG. 4, where curve 41 shows how the frequency difference $\Delta f$ between the two resonant frequencies varies with the distance $\delta$. To eliminate this unfavourable influence to a still larger extent the cavity can, according to a further development of this invention, be supplied with an element in the form of a disc, ring, sphere or similar shape, through which erroneous measurements due to variations in the distance $\delta$ between the cavity halves completely or partly are eliminated. Curve 42 in FIG. 4 shows how this causes the frequency difference $\Delta f$ to vary to a much less extent with a varying $\delta$. For a distance $\delta$ of approximately 3.5 mm., $\Delta f$ is approximately constant.

In FIG. 5 there is shown how this effect is obtained by means of dielectric discs 51 and 52, mounted in the two cavity halves.

In FIG. 6 it is shown how the same effect is obtained through circular deformations 61 and 62 in the walls of the cavity halves. These deformations are identical in the two halves. The dimensions can in some instances be determined from the equations $$2z_1 + l = L \tag{1}$$

$$d/rL \sin \pi l/2L = A \tag{2}$$

where the quantities $z_1$, $l$, $L$, $d$ and $r$ are defined in FIG. 6 and the quantity A is the slope of the curve in FIG. 7, which shows how the normalized frequency difference varies with the distance $\delta$ for an ordinary cavity.

The cavities mentioned above can operate in conjunction with the other units in many different ways in a device according to the invention. FIG. 8 shows the case when the cavity 81 enters as a frequency determining element in the energy source 82 and the indication circuit 83 is arranged to be sensitive to the varying frequency of the energy source 82 due to the passage of the material through the cavity 81.

FIG. 9 shows the case when the device comprises another high frequency source 91 in which the cavity 81 enters as a frequency determining unit and where this cavity has pronounced resonant properties both for energy in the mode $TE_{011}$ from the energy source 82 and for energy of the mode $TM_{111}$ from the energy source 91 and where the indicator circuit 83 is arranged to be sensitive to the difference between the frequencies of the energy sources, said frequencies varying due to the passage of the material through the cavities, and where this difference is detected by the mixer 92.

FIG. 10 shows the case, when the device comprises another high frequency energy source 102, in which a reference cavity 101, similar to the cavity 81 mentioned above, enters as a frequency determining cavity, where the cavity 81 has pronounced resonant properties for energy of the $TE_{011}$ from the energy source 82 and the reference cavity 101 has pronounced resonant properties for energy of the same mode from the energy source 102, and where the indicator circuit 83 is arranged to act in same way as described in connection with FIG. 9.

FIG. 11 shows the case, when the device comprises a high frequency electric energy source 110, the frequency of which varies periodically, within a certain frequency interval, a material unit 111 made as an electric cavity with pronounced resonant properties within the frequency interval mentioned, a detector 112 which is built in juxtaposition with circuits for differentiation, rectification, amplification and limiting of a signal from the cavity 111, and an indications circuit 113 for indicating the moisture content of a material in dependence of the energy transmission from the energy source 110 through the cavity 111 and the detector 112.

The cavity according to FIG. 12 is a rectangular material unit with a slit 120 in the front side of the cavity and with a similar slit in the hidden back side. This can be designed for a conveyor belt, which is used for the transportation of wood-chips or the like through the cavity. The band of horizontal lines is meant to represent the electric field for electric energy transmission through the cavity. The indicated position of the opening 120 relative to the electric field makes the change of resonant frequency moderate in the presence of a conveyor belt with material and also causes the resonance to be "sharp." As the electric field is approximately the same over the cross section of the conveyor belt, all material on the belt will influence the change of the resonant frequency to the same extent.

It is possible to modify the arrangements described above so that the indication device 13 receives a signal which depends on the time $t_1$ within each period of the signal from the generator, for the creation of the resonant frequency of the energy transmission through the cavity 11. Starting from the curve in FIG. 2, one forms from the signal coming from the cavity in a known manner by means of differentiation, positive clipping, another differentiation, positive clipping and inversion, a pulse P1 accurately defined in time, see FIG. 13. Starting from the curve according to FIG. 13 one forms from the signal from the oscillator 10 in a known manner by a circuit 90, see FIG. 15, a pulse P0, accurately defined in time, see also FIG. 13. The pulses P1 and P0 are fed to a bistable multivibrator 919, on the output side of which a rectangular pulse according to FIG. 14 is obtained. The series of rectangular pulses are fed to the indication device 13, which is made and calibrated to show the percentage moisture content of the paper.

One more modification is shown in FIG. 16. This device embodies the units 10, 11, 12, 13 and 919, as the device according to FIG. 15, but also a reference cavity 101, coupled to the output side of the oscillator 10, and a detector 1020 of the same design as the detector 12. The detector 1020 is coupled between the reference cavity 101 and the multivibrator 919, to which is fed both a pulse P1 caused by the cavity 11 with the paper 14 passing through it and also a pulse P2, caused by the reference cavity 101. The multivibrator 919 sends the indication device 13 a series of pulses, each of which has a duration equal to $t_2-t_1$, see FIG. 17. By measuring the direct current value of the series of pulses in the indication device 13, one obtains a measure of $t_2-t_1$ and thereby, a measure of the moisture content of the paper 14.

It has been mentioned above that information is obtained from the indication device 13 about, for example, the amount of moisture in a paper passing through the cavity. It has then tacitly been assumed that the paper has a constant thickness. If this is not the case, the device 13 could show the same percentage figure for two papers with different thicknesses which have different amounts of moisture per unit volume or show different percentage figures for two papers with different thicknesses, which have the same amount of moisture per unit volume. This is, of course, a disadvantage in certain cases, and to eliminate this disadvantage one can let the paper pass through both a measuring device according to FIG. 11 and also through a measuring device according to FIG. 15. The results of both these measurements will then give the percentage of moisture content for the thickness in question. If, for practical reasons, the material unit (the cavity) must be opened when the solid material is to be put in, there is a risk that the accuracy of the measurement becomes strongly dependent on the accuracy with which the distance between the halves of the cavity is adjusted. This disadvantage can be eliminated by means of a cavity designed so that it has pronounced resonant properties for energy of two different modes of oscillation such as $TE_{011}$ and $TM_{111}$. When there is not any solid material between the halves of the cavity the resonant frequency is the same for both modes. When a paper is placed between the halves mentioned, the resonant frequencies for the two modes of oscillation are changed differently and the difference between the two resonant frequencies becomes a measure of the moisture content of the paper.

If the distance between the halves is changed slightly, both resonant frequencies are displaced approximately by the same amount, and therefore the error in the measurement due to such changes becomes relatively small.

With a cavity which has pronounced resonant properties for two different modes of oscillation, it can under some circumstances be advantageous to let the resonant frequencies for the empty cavity be adjacent but slightly different. Thereby the measurement of relatively small amounts of moisture is facilitated. When measuring the moisture content of a paper with unknown thickness, two devices according to FIG. 15 can be used. In such a case the cavity of one of the measuring devices has pronounced resonant properties for two adjacent but well separated frequencies, while the cavity of the other measuring device has pronounced resonant properties for two adjacent but well separated frequencies, which are substantially different from the resonant frequencies of the cavity first mentioned. The moisture content can then be determined by combining the results from the two measuring devices.

Above, the invention has mainly been discussed in connection with the measurement of the water content in paper. The discussion concerning the influence of the thickness of the paper shows, however, that the invention can equally well be used to measure the thickness of a paper in which case the influence of different relative moisture content can be eliminated. The invention is naturally not limited to paper, or to the measurement of moisture content or thickness, but will be of use whenever one wants to measure such properties of a material, that can influence the resonance condition in a cavity. That the material has to be "solid" only means that the structure should be such that it can be brought in and out of a cavity.

A material in form of a powder enclosed in a thin envelope can, for example, therefore be considered as a solid material according to this terminology.

What is claimed is:

1. Apparatus for measuring a property of a material comprising a high frequency electric energy source means for transmitting energy having a frequency periodically varying within a given range of frequencies, cavity resonator means comprising a hollow circular cylinder body divided into two cavity parts by a plane perpendicular to the axis of the cylinder electrically connected to said electrical energy source means, said cavity resonator means being designed for accepting the material whose property is to be measured, said cavity resonator means being designed to have two resonant frequency peaks within said given range of frequencies, one of said resonant frequency peaks being dependent on the material property to be measured, the other frequency peak being independent of the material property to be measured, and indicator means connected to said cavity resonator means for producing a signal dependent on the difference of time of occurrence of the two frequency peaks.

2. The apparatus of claim 1 wherein the two cavity parts are approximately equal in dimensions, and one of said cavity parts including an electrical symmetry impairing element whereby the resonant cavity member has resonant peaks at two distinct frequencies.

3. The apparatus of claim 2 wherein the inner surface of each of said cavity parts is provided with means for minimizing variations in frequency difference between the resonant frequency peaks due to variations in spacing between said cavity parts.

4. Apparatus for measuring a property of a material comprising a high frequency electric energy source means for transmitting energy having a frequency periodically varying within a given range of frequencies, said electric energy source means including first and second high frequency energy sources, and cavity resonator means having a first resonant peak in one mode of oscillation in response to said first high frequency energy source and having a second resonant peak in another mode of oscillation in response to said second high frequency energy source, said cavity resonator means electrically connected to said electrical energy source means, said cavity resonator means being designed for accepting the material whose property is to be measured and designed to have two resonant frequency peaks within said given range of frequencies, one of said resonant frequency peaks being dependent on the material property to be measured, the other frequency peak being independent of the material property to be measured, and indicator means connected to said cavity resonator means for producing a signal dependent on the difference of time of occurrence of the two frequency peaks.

5. The apparatus of claim 4 wherein said first resonant cavity member has a resonant frequency peak in one mode of oscillation and said second resonant cavity member has a resonant frequency peak in a different mode of oscillation.

6. Apparatus for measuring a material comprising a high frequency electric energy source means for transmitting energy having a frequency periodically varying with a given range of frequencies, said electric energy source means including first and second high frequency energy sources, a cavity resonator means including first and second resonant cavity member, each of said resonant cavity members being connected to one of said high frequency energy sources, respectively, said cavity resonator means being designated for accepting the material whose property is to be measured and designed to have two resonant frequency peaks within said given range of frequencies, one of said resonant frequency peaks being dependent on the material property to be measured, the other frequency peak being independent of the material property to be measured, and indicator means connected to said cavity resonator means for producing a signal dependent on the difference of time of occurrence of the two frequency peaks.

References Cited

UNITED STATES PATENTS

| 3,211,993 | 10/1965 | Golden et al. | |
| 2,524,290 | 10/1950 | Hershberger | 324—58.5 |
| 2,527,619 | 10/1950 | Brehm et al. | |
| 2,548,598 | 4/1951 | Feiker | 324—58.5 |
| 2,587,055 | 2/1952 | Marshall. | |
| 2,714,662 | 8/1955 | Norton | 324—58.5 X |
| 2,792,548 | 5/1957 | Hershberger | 324—58.5 |
| 2,972,105 | 2/1961 | Ghose | 324—58.5 X |
| 3,034,046 | 5/1962 | Sasaki | 324—58.5 |
| 3,176,249 | 3/1965 | Schelisch et al. | |

RUDOLPH V. ROLINEC, Primary Examiner

P. F. WILLE, Assistant Examiner

U.S. Cl. X.R.

333—83